INVENTOR.
HANS O. IRMSCHER
BY Louis Barnett
ATTORNEY

Nov. 24, 1959 H. O. IRMSCHER 2,913,860
MANUFACTURE OF PACKAGES WITH STRING HANDLES AND TAGS
Filed March 1, 1949 13 Sheets-Sheet 5
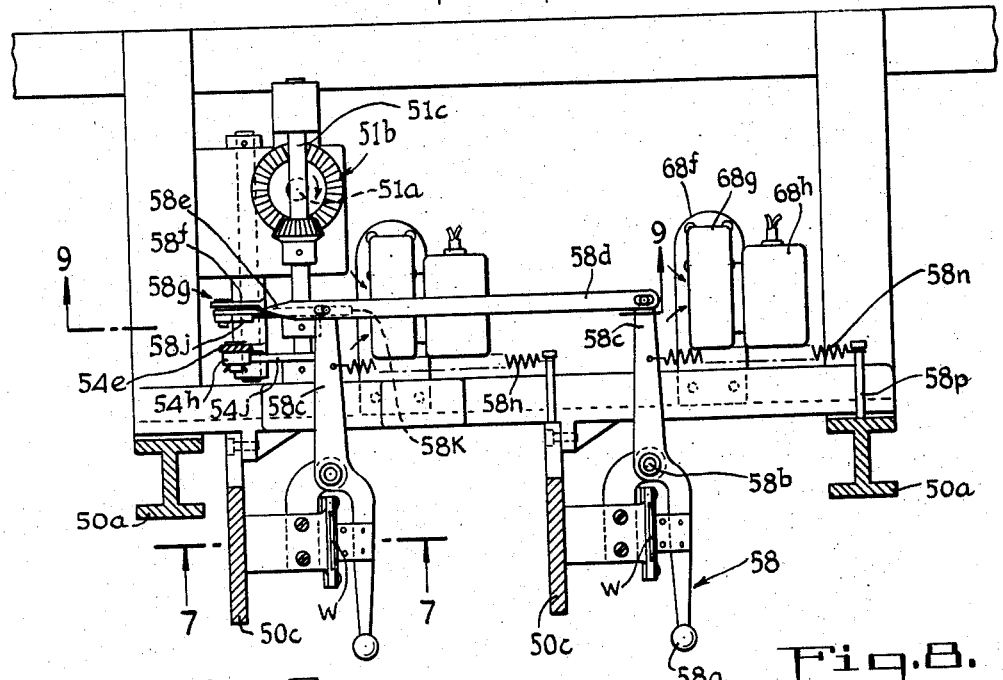
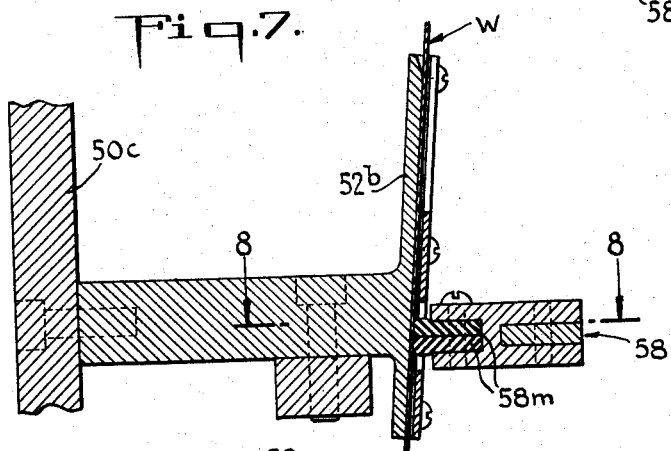
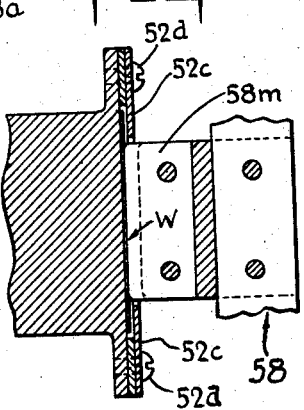
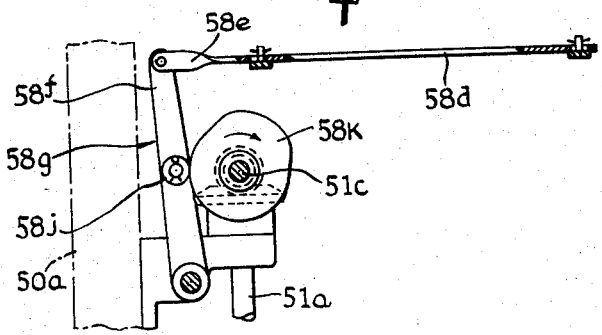
INVENTOR.
HANS O. IRMSCHER
BY
Louis Barnett
ATTORNEY

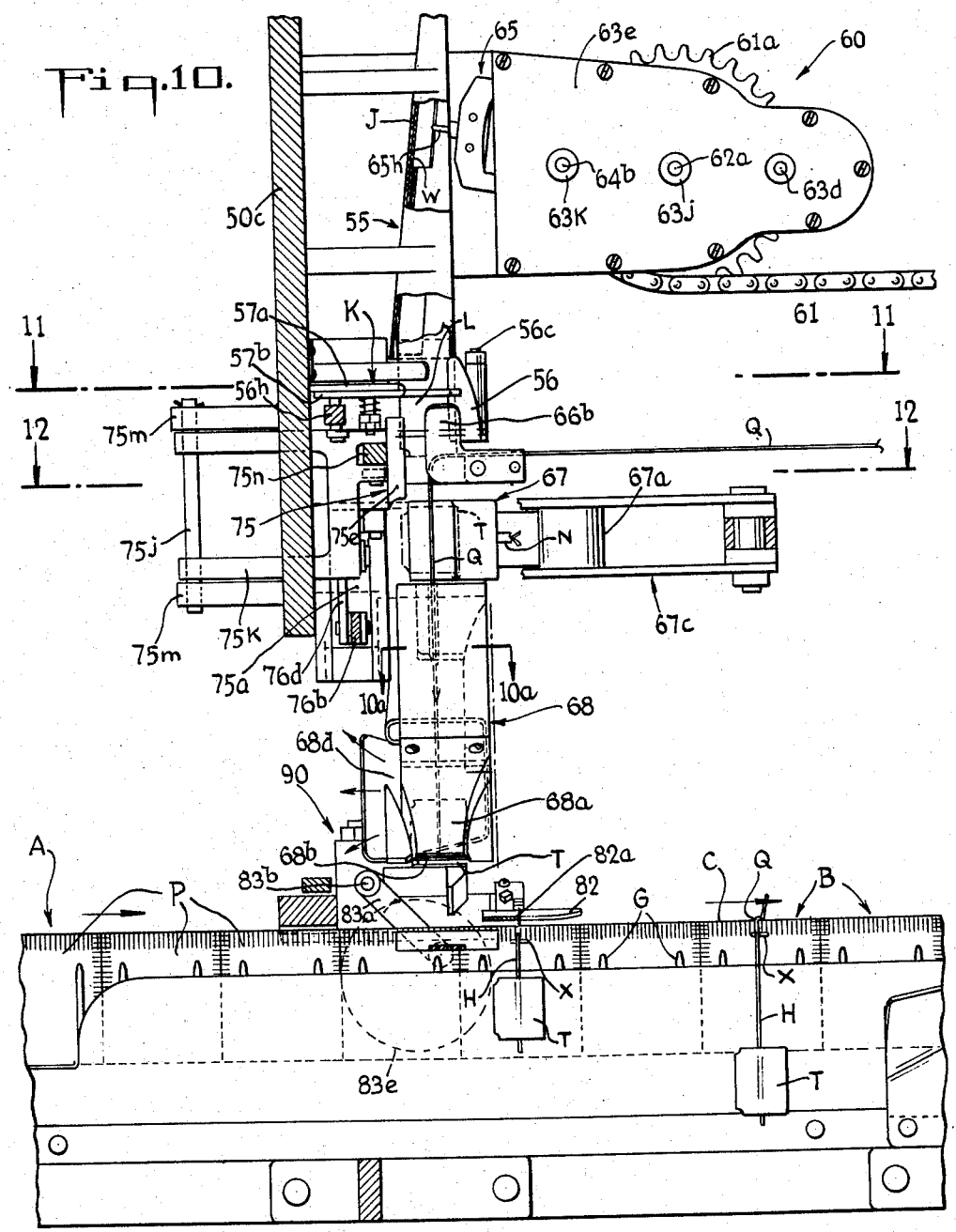
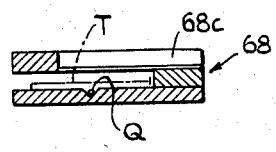

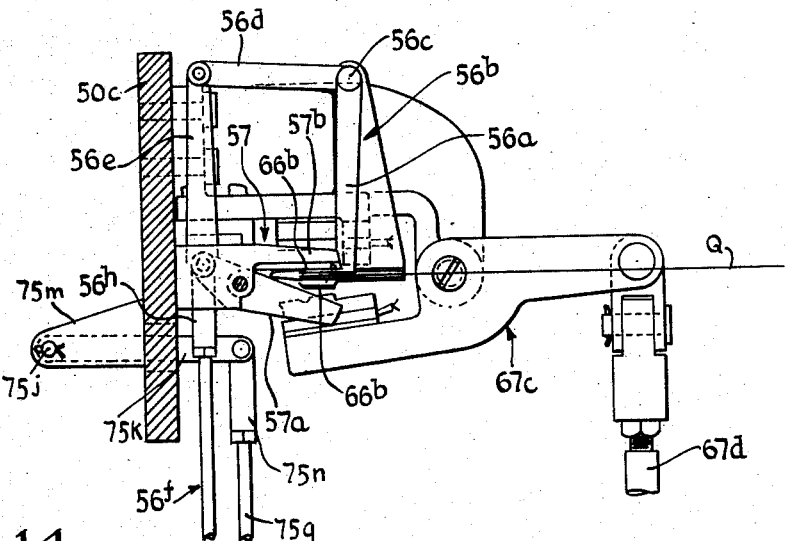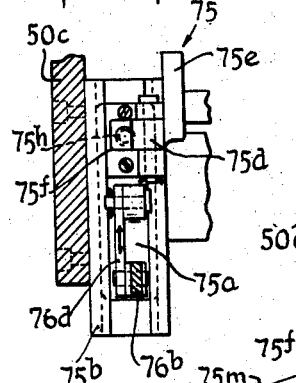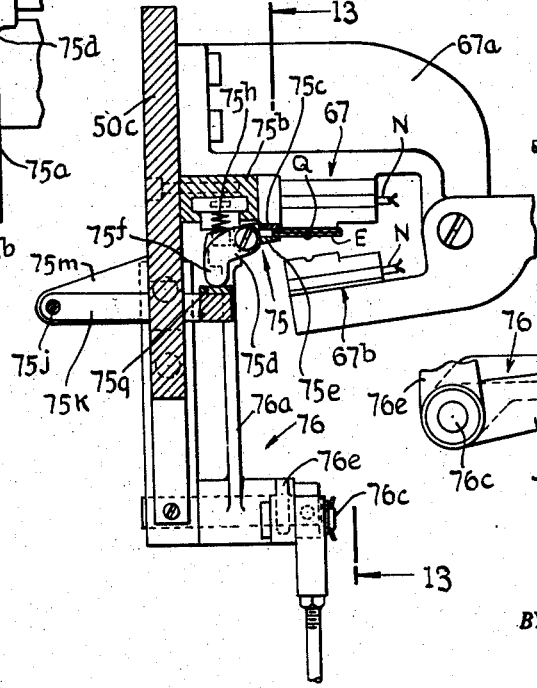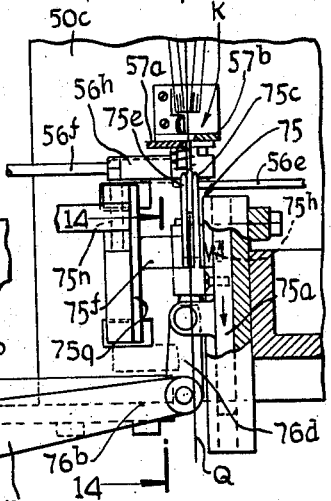

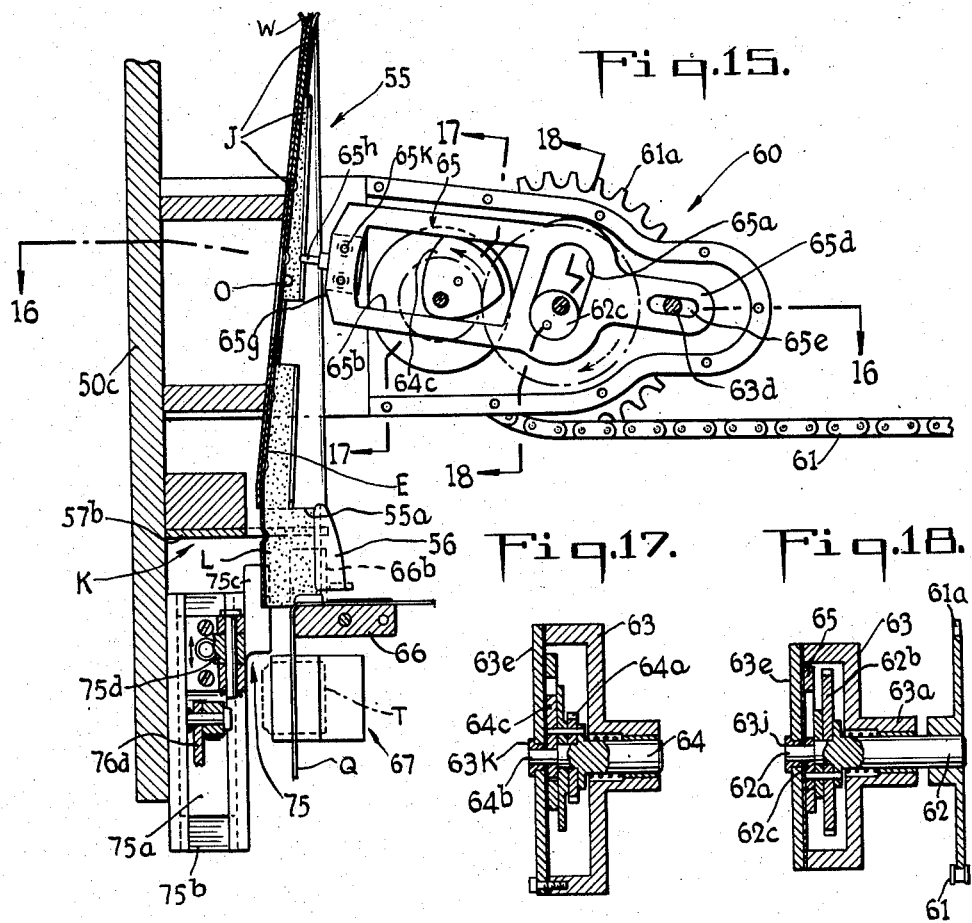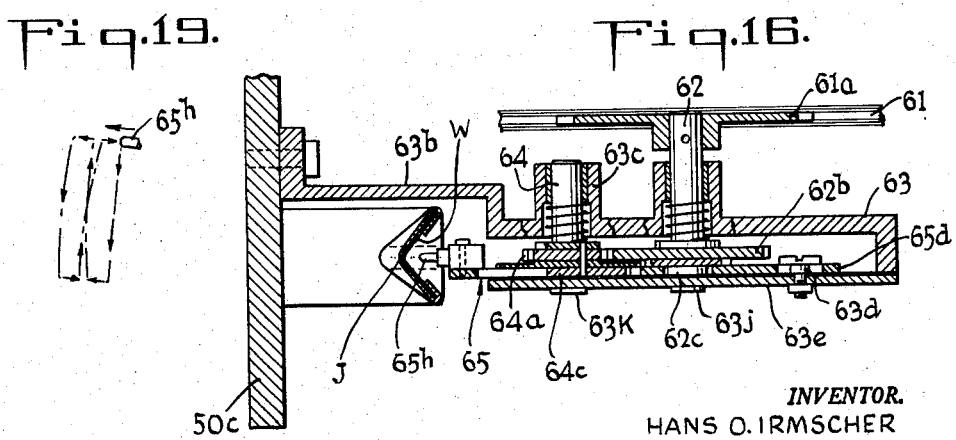

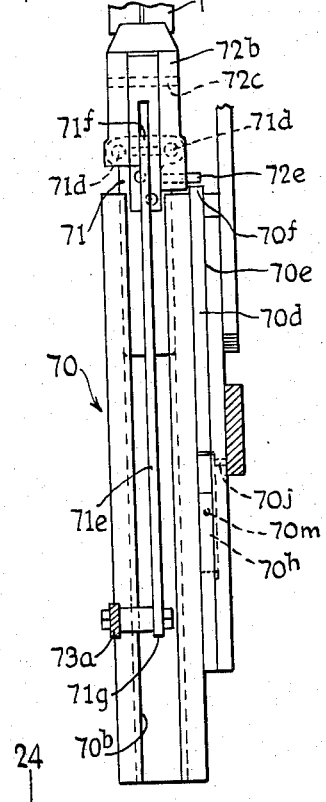

Nov. 24, 1959   H. O. IRMSCHER   2,913,860
MANUFACTURE OF PACKAGES WITH STRING HANDLES AND TAGS
Filed March 1, 1949   13 Sheets-Sheet 10
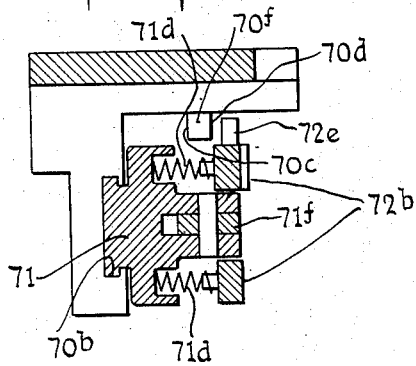
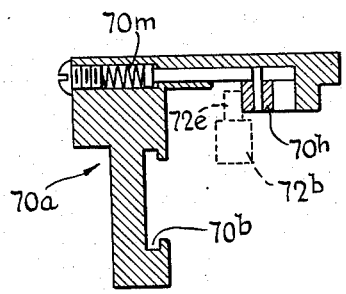
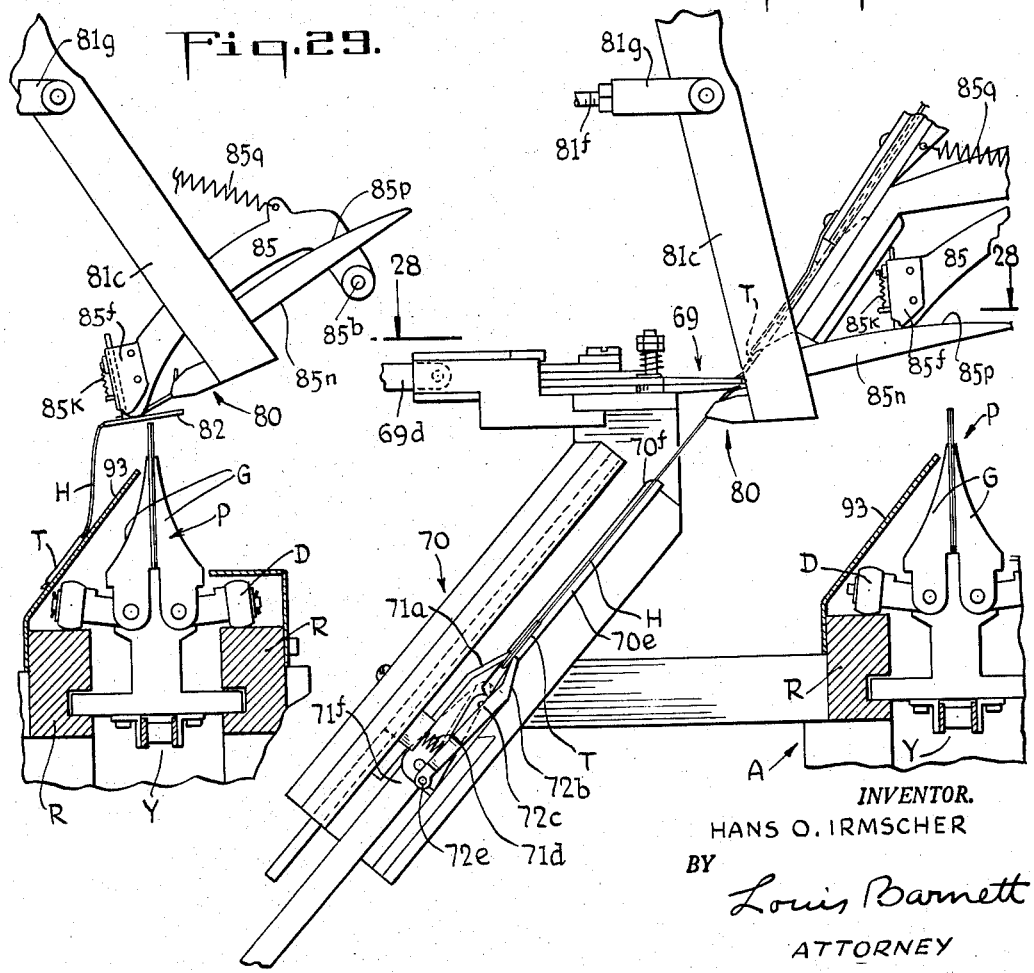
INVENTOR.
HANS O. IRMSCHER
BY Louis Barnett
ATTORNEY

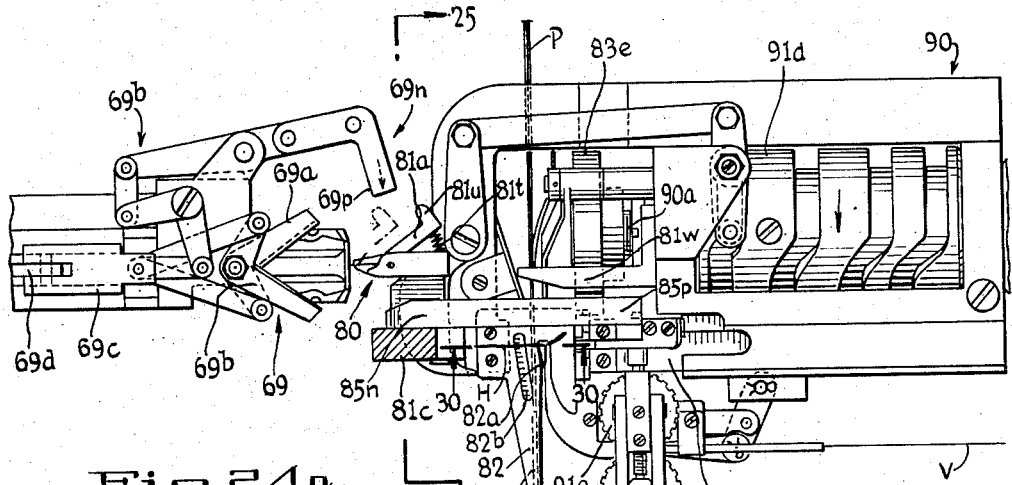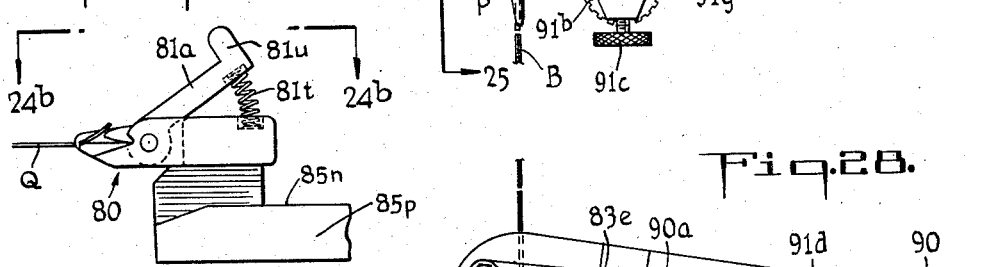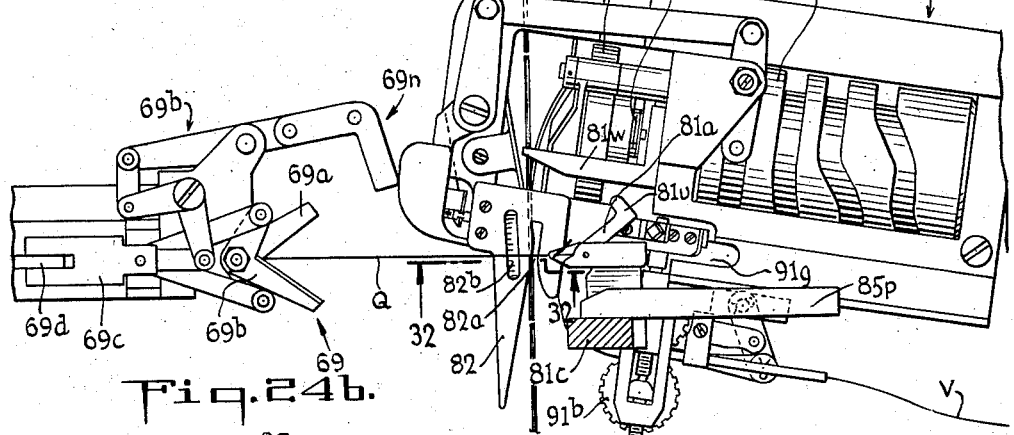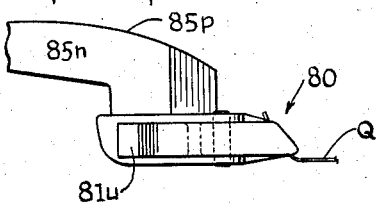

INVENTOR.
HANS O. IRMSCHER
BY Louis Barnett
ATTORNEY

Nov. 24, 1959     H. O. IRMSCHER     2,913,860
MANUFACTURE OF PACKAGES WITH STRING HANDLES AND TAGS
Filed March 1, 1949     13 Sheets-Sheet 13

*INVENTOR.*
HANS O. IRMSCHER
BY Louis Barnett
*ATTORNEY*

United States Patent Office 2,913,860
Patented Nov. 24, 1959

2,913,860

MANUFACTURE OF PACKAGES WITH STRING HANDLES AND TAGS

Hans O. Irmscher, East Hempstead, N.Y., assignor to National Tea Packing Company Inc., a corporation of New York Application March 1, 1949, Serial No. 79,034

26 Claims. (Cl. 53—14)

This invention relates to the manufacture of packages with string handles and tags. More particularly the invention is directed to a mechanism and machine combination for forming tags to terminate string handles and attaching same to filled packages, for example, as can be incorporated in super high-speed, fully automatic machines for making complete articles in quantity production, such as, in the manufacture of tea balls or other essence containing infusion packages, and to an improved method for manufacturing tags terminating string-handles and applying same to filled packages during passage thereof in quantity production at a rate of speed higher than heretofore.

Among the objects of the invention is to provide an improved mechanism or machine combination and method of the character described comprising an assembly of parts which shall be compactly arranged for automatically performing all the various operations necessary to form a tag terminating at one end of each string handle and attaching the other end of said string handle to each filled package during the process of being manufactured in quantity production, which shall require minimum attention in operation, which shall be relatively inexpensive to construct yet capable of handling larger capacities outputs of productions of filled packages than heretofore, which shall be capable of being incorporated into or operated in conjunction with super high-speed automatic filled package manufacture to provide a smooth running, dependable and reliable installation unit and which shall be practical and efficient to a high degree in use.

Other objects of this invention will in part be obvious and in part hereinafter pointed out.

The invention accordingly consists in the features of construction, combinations of elements and arrangement of parts which will be exemplified in the method and construction hereinafter described and of which the scope of application will be indicated in the following claims.

In the accompanying drawing, in which is shown one possible illustrative embodiment of this invention.

Fig. 6 is a sectional plan view taken on lines 6—6 in Fig. 1 showing the slack control.

Figs. 7 and 9 are fragmentary enlarged cross-sectional views showing details taken on lines 7—7 and 9—9, respectively, in Fig. 6.

Fig. 8 is a fragmentary enlarged cross-sectional view showing details taken on lines 8—8 in Fig. 7.

Fig. 10 is a fragmentary elevational view showing the tag forming and feeding operations.

Fig. 10a is a cross-sectional view taken on line 10a—10a in Fig. 10.

Figs. 11 and 12 are fragmentary plan cross-sectional views showing the duplicate heat sealing of the tag forming operation on to the string-handle section taken on 11—11 and 12—12, respectively, on Fig. 10.

Figs. 13 and 14 are fragmentary enlarged cross-sectional views showing details of tag forming operation taken on lines 13—13 in Fig. 12 and lines 14—14 in Fig. 13, respectively.

Fig. 15 is a vertical view in section taken centrally through the folder showing the automatic tag feeding operating parts exposed.

Figs. 16, 17 and 18 are detailed cross-sectional views taken on lines 16—16, 17—17 and 18—18, respectively, in Fig. 15 showing assembly construction of the tag feeding means.

Fig. 19 is a diagrammatic view showing the path of the oscillator actuating finger taken to advance the tag tape sheet material a distance of one tag length.

Fig. 20 is a fragmentary side elevational view showing the movement of the string-handle and tag during the operation of anchoring means.

Figs. 21, 22 and 23, are cross-sectional views taken in lines 21—21, 22—22 and 23—23 of Fig. 20 showing details of assembly thereat, respectively.

Figure 25:
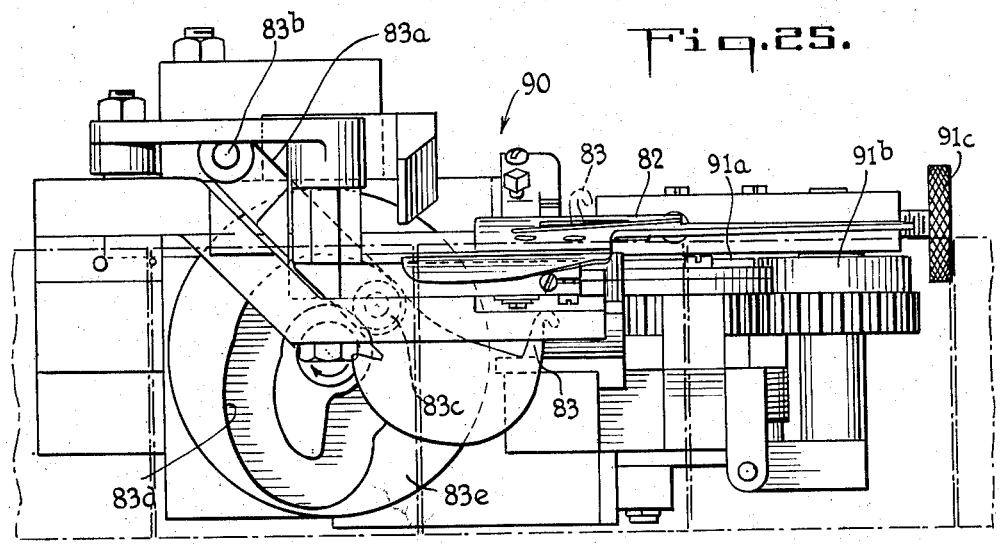

Figs. 24 and 25 are fragmentary cross-sectional plan and side elevational views showing the string-handle cutting and stapling operational means, corresponding to cut taken on lines 24—24 in Fig. 20 and lines 25—25 in Fig. 24 respectively.

Fig. 24a is an enlarged detailed view showing gripping jaws of the transferor in an effective position.

Fig. 24b is a detailed cross-sectional view taken on line 24b—24b in Fig. 24a.

Figure 26:
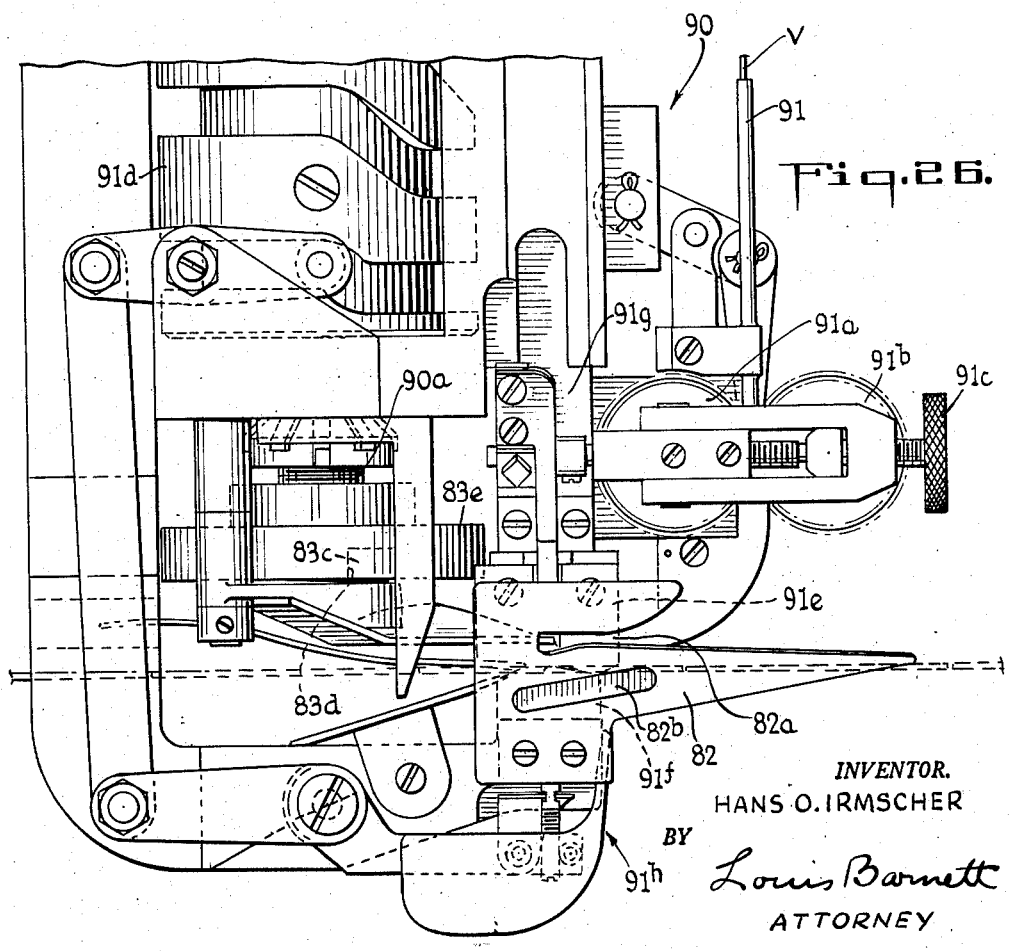

Fig. 26 is a fragmentary plan view of Fig. 25.

Figs. 27 and 28 are fragmentary views showing the string-handle cutting means in effective position, Fig. 27 being similar to portions of Fig. 20 and Fig. 28 corresponding to a plane view taken on lines 28—28 in Fig. 27.

Fig. 29 is a fragmentary elevational view showing the string-handle anchoring operational means with the parts in position just prior to the anchoring of the string-handle to the top heat sealed seam of the filled tea-bag.

Figure 30:
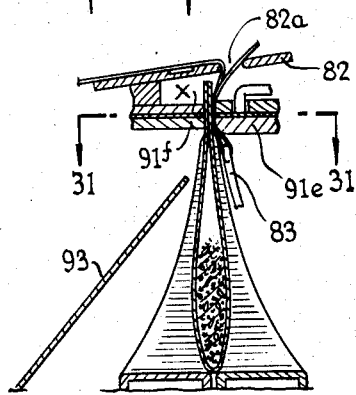
Figure 31:
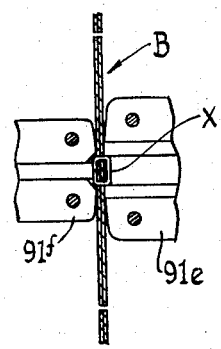

Figs. 30 and 31 are sectional views taken on line 30—30 in Fig. 24 and line 31—31 in Fig. 30, respectively, showing the stapling operation.

Figure 34:
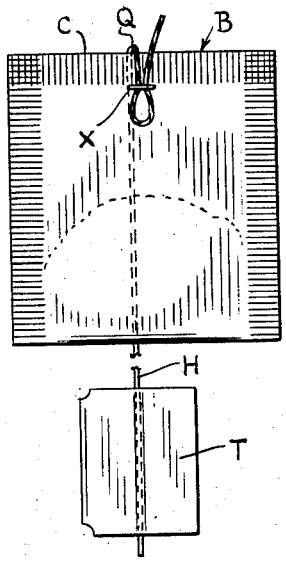
Figure 32:
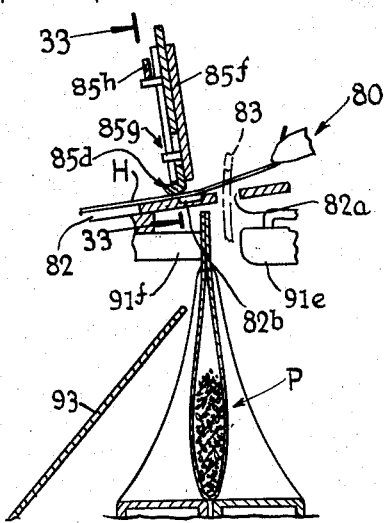
Figure 33:
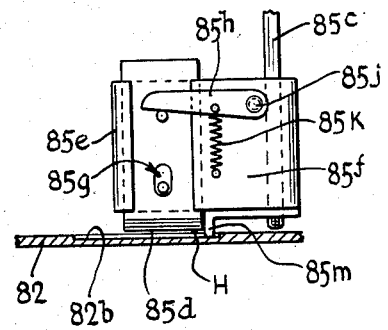

Figs. 32 and 33 are sectional views taken on line 32—32 in Fig. 28 and line 33—33 in Fig. 32, respectively, showing the operation of applying the string-handle to the package closure seam prior to stapling, and Fig. 34 is a view showing the stapled string-handle attached side of a complete tea ball manufactured by the apparatus and method embodying the invention.

Referring in detail to the drawing 50 denotes generally a mechanism embodying the invention for forming tags from a continuous strip or web of relatively thin pliably bendable sheet material W printed or unprinted on an outer side O thereof and having a heat-sealed coating on opposite side E, longitudinally folded over on said side E in face to face relation and cut into sections the length of one tag which when heat sealed with end portions of string-handles H interposed between the folds of the tag section provide individual tags, T, and for attaching, that is, as here shown, stapling, the other or free end portions Q of said string-handles H to heat-sealed closure seams C of filled packages P, as hereinafter described.

Figure 1:
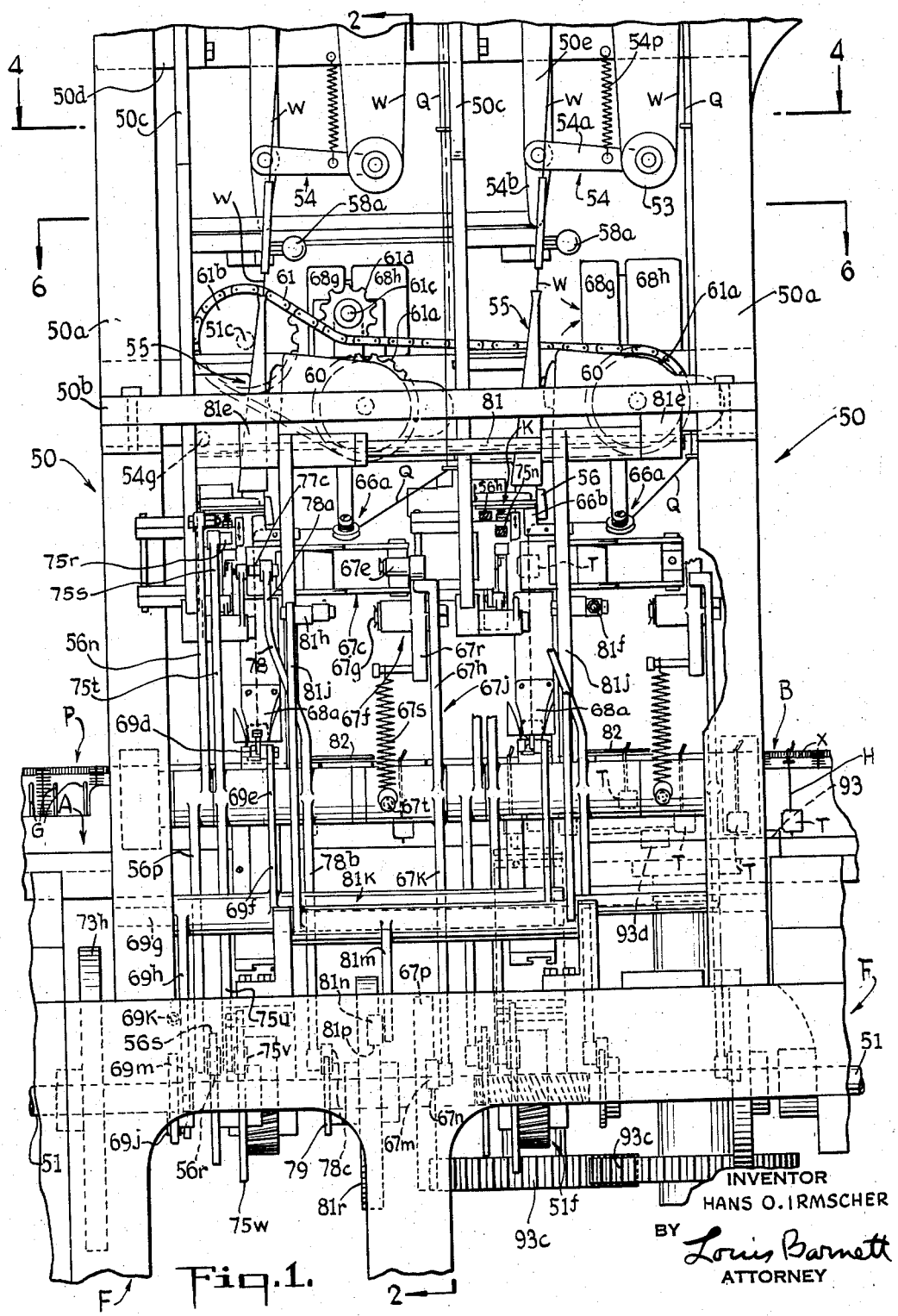
Fig. 1 is a front elevational view of a portion of a super high speed automatic packaging machine having incorporated therewith an automatic tag making and string-handle attaching mechanism constructed to embody the invention.
Figure 2:
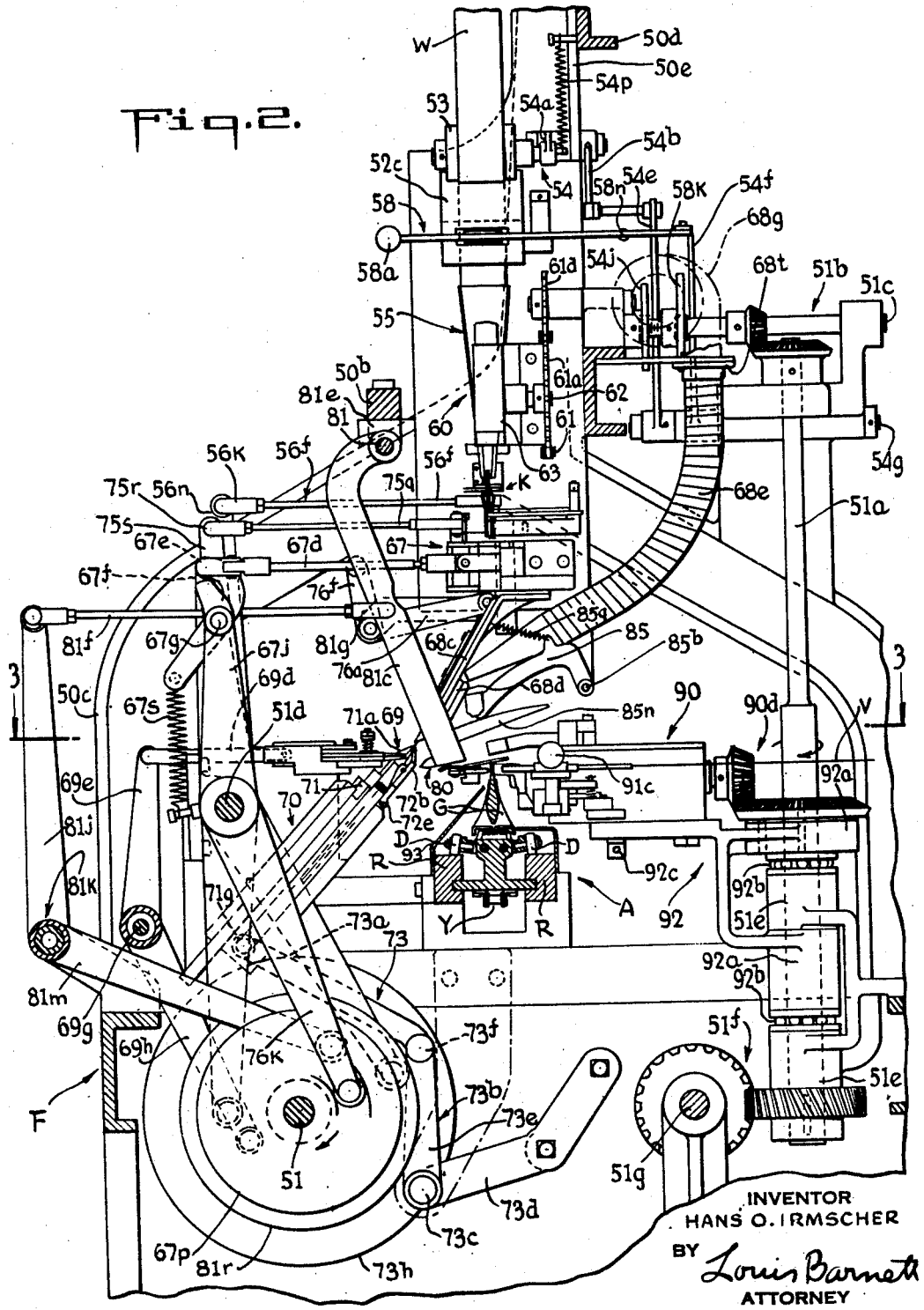
Fig. 2 is a vertical cross-sectional view taken on lines 2—2 in Fig. 1 showing details of the improved construction and the incorporated assembly.

Said mechanism 50, as shown in Figs. 1 and 2, may have spaced apart side supports 50a firmly secured in straddling positions to upstand vertically from mid-portions of horizontally extending base frames F of a fully automatic infusion package manufacturing machine A. Said supports 50a may be rigidly interconnected by a horizontally extending cross bar 50b and have parallelly disposed vertically extending rigid bracket members 50c spaced between said frame supports 50a to serve as intermediate support extensions thereof for the various component parts of mechanism 50.

Machine A, suitable for manufacturing stringless and tagless tea balls or filled packages P, with the exception of mechanism 50 may be like that fully disclosed in applicant's copending application Ser. No. 450,289, filed July 9, 1942, now Letters Patent No. 2,475,617, granted July 12, 1949, for Infusion Package Manufacture, this application being a continuation in part thereof.

Said patent, however, specifically discloses machine A operating to fill and heat seal bag sections for making two tea-balls P at one time, whereas mechanism 50 herein described and shown is capable of handling twice that output, namely, four such tea-balls P. In the present embodiment of this invention, reference to machine A will assume it to have the four tea-ball P at a time output in uninterrupted sequence.

Mechanism 50 when incorporated in machine A in the manner hereinafter described to embody the invention produces finished article packages such as tea balls B with string-handles H and tags T in an automatic continuous manufacturing operation. Such embodiment of mechanism 50, is shown in the drawings, in Figs. 1, 2 and 10 or as may be used independently of, or combined with other like packaging machines in the time production relation. Preferably mechanism 50 is made effective after top closure seam C, of teaballs P have been heat sealed after being manufactured by machine A, of stringless and tagless teaballs P of the square pillows shaped type in continuous sequence in high-speed quantity production. Mechanism 50 thus automatically operates to supply and attach string-handles H and tags T as required prior to delivery in counted groups at super high-speed for packing tea balls B in containers as shown in applicant's copending application Ser. No. 35,373, filed June 26, 1948, now Letters Patent No. 2,577,765, granted December 11, 1951.

As fully described in said copending application, Ser. No. 450,289, now Patent No. 2,475,617, said machine A in manufacturing said teaballs P, has a strip of heat sealing filter paper or similar suitable web material continuously fed thereto. Said web material is moved horizontally and is longitudinally folded to provide a closed bottom and an open top, being gripped transversely the length thereof between continuously moving pairs of closely spaced pincer jaws G of machine A as shown in Figs. 10, 20, 27 and 29. Said jaws G, are carried on an endless chain belt Y and are controlled for effective opening and closing movement by suitable spring and camming action of rollers D riding on spaced rails R supported on frame F. Each jaw G is made U-shaped or forked to grip said folded strip transversely to form successive empty bag sections of said moving strip. Said bag sections each extends between the forked portions of each pair of jaws G leaving top edge of the bag section open to project above the upper level of said jaws G. As the empty bag sections in said machine A continuously travel they are filled with infusing material, such as tea leaves, during part of the path of movement thereof by suitable charging means through said bag section top edge openings, after which said top openings and transversely extending side closure between adjoining filled sections are heat-sealed four at one time by electrically heated dies provided for that purpose. Filled bag sections with permanently top closures C after being cut apart by suitable shearing means, as knives K form said individual tea balls P which continue uninterruptedly to advance through the machine A.

In the present embodiment of the invention said mechanism 50 automatically cooperates in timed sequence with the movement of said heat-sealed top closure C just after knives K have been effective to leave individual tea-balls P each between a pair of jaws G as shown in Figs. 1, 2, 3, 10 and 20. To that end, there is provided and carried on supports 50a and bracket members 50c spaced apart duplicate sets of tag forming and string-handle applying means sufficient to service machine A when manufacturing tea-balls P, four at a time having an over all output in excess of 350 tea-balls B per minute each with a string handle H and tag T. Said sets each is provided with a suitable supply of said tag tape material W from a reel M which may be elevated above the level of supports 50a for continuously passing over spaced apart rollers 52 and 52a mounted on a horizontally extended top cross channel 50d and under a slack-drawing roller 53 positioned therebetween at a lower level, as is clear from Figs. 1 and 5.

Figure 4:
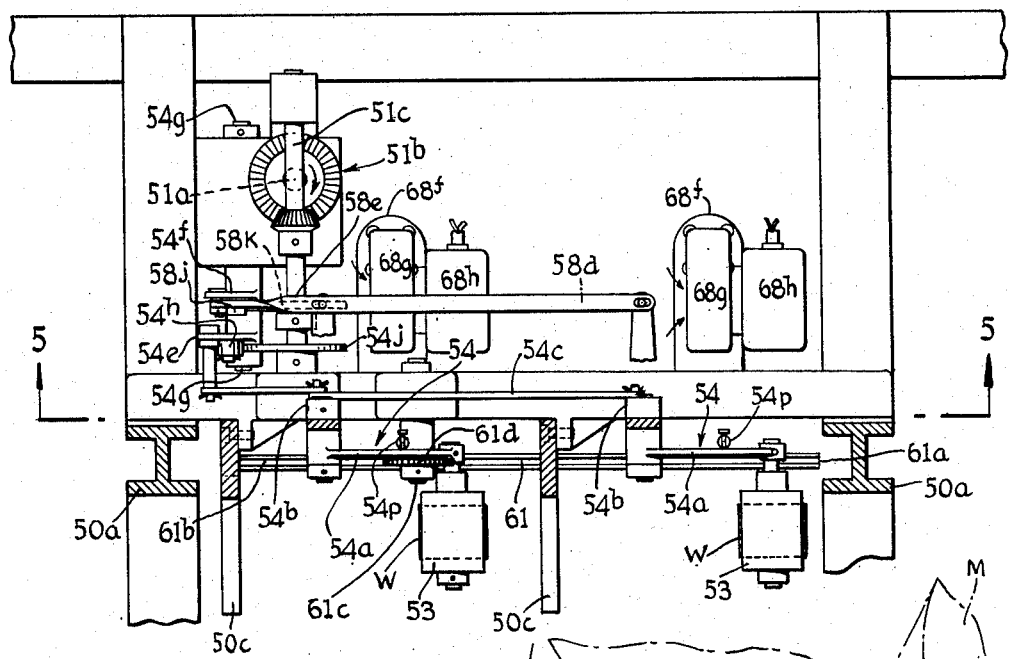
Fig. 4 is a plan cross-sectional view taken on lines 4—4 in Fig. 1 showing the slack feed supply portion.
Figure 5:
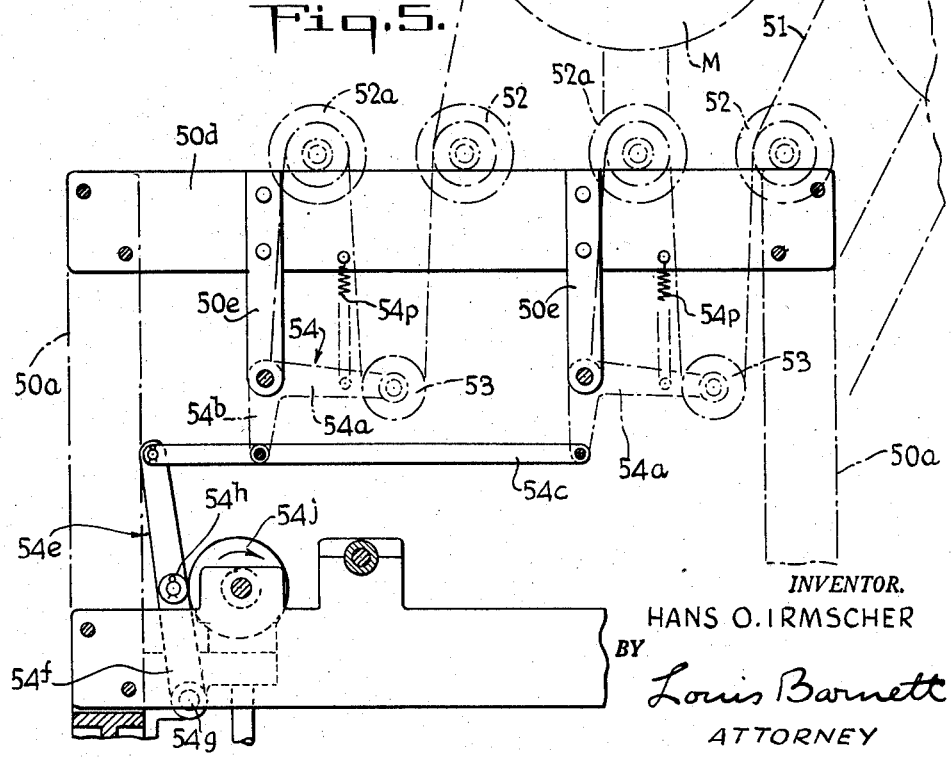
Fig. 5 is a vertical view of the slack supply portion of the improved mechanism taken on lines 5—5 in Fig. 4.

Each roller 53 may be mounted for rotation at free end of a horizontally disposed arm 54a of an offset bell crank lever 54, that is suitably pivoted on a downwardly extension 50e from said cross channel 50d to permit swinging movement of said roller 53 toward and away from said rollers 52 and 52a, as shown in Figs. 1, 2 and 4, ends of the other downwardly extending arms 54b of said duplicate sets of levers 54 being interconnected by bar compounding link 54c which in turn may pivotally connect with free or upper end of a lever 54e, the other or lower end 54f of lever 54e being pivoted at 54g as shown in Figs. 4 and 5.

A roller 54h is rotable carried at a midportion of lever 54e which rides on a disc cam 54j, the latter being driven in time relation with the operation of tag tape feeder, denoted generally at 60, shown in Figs. 1, 2 and 10, through a suitable power transmission, such for example as, a short horizontally extending shaft 51c carrying disc cam 54j, and speed increasing bevel gearing 51b interconnecting shaft 51c to a vertically secondary drive-shaft 51a.

A suitable tension spring 54p is provided for each arm 54a to counteract the weight of said slack tension roller 53, and at the same time urging lever 54e to hold roller 54h in an effective position against cam disc 54j, for controlling the effective tension on tag tape material W being unwound from the supply reels M.

As seen in Figs. 1, 6, 7, 8 and 9, the control means for unwinding of the duplicate tag tape materials W also includes spaced apart hand lever 58, each terminated at a forward extending end in a gripping knob 58a and pivoted at a mid-portion at 58b. The other ends 58c of levers 58 may be interconnected by bar compounding link 58d which in turn has an end 58e pivoted to an upper end 58f of an upright actuating lever 58g. The latter may be pivoted at lower end 58h, thereof, a midportion of said lever 58g carrying a roller 58j to ride on a disc cam 58k mounted to turn with said shaft 51c.

Each hand lever 58 also has mounted to extend therefrom and move therewith a resilient buffer 58m between knob 58a and pivot 58b. Said buffer 58m which may be made of rubber normally is held in an effective position for releasably retaining a portion of tag tape material W, after passing down from roller 52, against a rigidly secured slide plate 52b by provision of suitable tension spring 58n fastened to lever end 58c and to anchor pin 58p, as shown in Fig. 6. Each slide plate 52b may be provided with parallelly spaced guide pieces 52c secured thereto by suitable means, such as, screws 52d so as to provide passage for the tag tape material W, and between which pieces 52c, the buffer 58m freely move to contact the tag tape material W as shown in Figs. 7 and 8. Thus on operation of lever 58g by disc cam 58k each lever 58 is caused to swing against the action of tension spring 58n, whereby the tag tape material W is automatically released from the grip between the plate 52c and the buffer 58m to be advanced through a folder 55 in timed relation as will hereinafter be described.

To manually control the gripping action of the buffer 58m, as for example, when threading the tag tape material W into operational position through folder 55, the hand lever 58 can be conveniently swung by means of knob 58a away from slide plate 52c.

From each of slide plates 52b, tag tape material W passes vertically downward through elongated funnel shaped folder member 55 being intermittently drawn therethrough by tag tape feeder 60.

Each tag tape feeder 60, as seen from Figs. 1, 10, 15 and 19, has a power chain drive 61, which through a sprocket 61a turns a shaft 62 journalled in a bearing 63a of a housing or casing 63, the latter being rigidly mounted through a suitable bolted base extension bracket 63b, as shown in Fig. 16. An end 62a of said shaft 62 overhanging bearing 63a carries a gear 62b within said casing 63, which meshes with gear 64a, mounted in an overhanging relation to turn with an end 64b of shaft 64 journalled in another bearing 63c of casing 63, spaced from said bearing 63a.

As seen from Fig. 15, an oscillating member 65 is mounted for compound reciprocation of up and down, and toward and away from the path of advancing movement of the tag tape material W in each folder member 55 through actuation due to the rotation of said shafts 62 and 64, which through end 62a turns a suitable cranking portion 62c. Since the latter engages with rim edge of an angularly disposed slot opening 65a provided in member 65 reciprocation results in said relative toward and away movement while shaft end 64b carrying an eccentric portion 64c which engages in and coacts with rim edges of a slotted opening 65b of said member 65 spaced from said opening 65a produces said relative up and down movement with respect to the path of the tag tape material W.

Member 65 may also be formed with a rear or tail end 65d having a small slot 65e into which a guide pin 63d extends, the latter being carried by cover 63e of the casing 63. Said cover 63e serves also to journal shaft ends 62a and 64b in spaced apart bearings 63j and 63k, respectively, as shown in Figs. 16, 17 and 18.

As seen from Figs. 10, 15 and 16, a front end 65g of member 65 opposite tail end 65d carries an actuating finger 65h secured to said front end 65g by suitable means such as bolted connection 65k. Said finger 65h is constructed and operated during said reciprocating movement of member 65 to advance for engaging into and to retract for disengaging from uniformly spaced holes J provided in tag tape material W thus drawing the latter in a downwardly direction when finger 65h is sweeped within folder member 55 during a downstroke on oscillation of member 65, and moving clear of said holes J during an upstroke thereof, as is clear from Figs. 15 and 19. Said folder member 55 is provided with a through open-ended slot 55b to permit clearance for the end of finger 65h.

As is clear from diagrammatic view Fig. 19, it has been found that satisfactory operation may be had when only each alternate downstroke is made effective for drawing the tag tape material W in a downwardly direction on oscillation of member 65, that is, the remaining two upstrokes and one downstroke of every two revolutions reciprocating finger 65h are ineffective and provide uniform dwell periods for the intermittent advancing movement given said material W.

Chain drive 61, as shown in Figs. 1 and 2, may be provided with a head sprocket wheel 61b mounted to overhang and turn with said short shaft 51c which may provide a drive for said chain drive 61 to operate member 65 in timed relation with the steps for manufacturing filled tea balls P by machine A, and a string-handle applying means, denoted generally at 70, in the manner hereinafter described. A suitable chain slack take-up means may be provided, as for example, idle sprocket 61d.

As shown in Figs. 10, 11 and 15, a fold spacer 56 is carried from just below lower end 55a of folder 55, to swing into folder 55, between and out of the folds of tag tape material W therein, on an end of an arm 56a of a horizontally disposed bell crank lever 56b which is pivoted at 56c, the other lever arm 56d connects through a short link 56e with drive rod 56f. An end 56h of drive rod 56f which connects with link 56e also actuates swingable cutting blade 57a of shears 57, a stationary blade 57b of shears 57 being located to terminate lower folder end 55a for severing a predetermined length L of tag tape material W after it has passed the shears 57. The other end 56k of drive rod 56f pivotally connects with one arm 56m of a double compounded sleeve shank lever 56n that is supported to swing on a stationary shaft 51d. Another arm 56p of lever 56n carries a roller 56r which rides on cam disc 56s mounted to turn with a main drive shaft 51 of machine A.

Thus on actuation of lever 56n, a tag length L is caused to be severed by shears 57 from tag tape material W while fold spacer 56 is swung to be interposed between the fold of the portion of tape material W within said folder 50 to insure passage of string strand S midway through tag length L.

As seen from Figs. 15 and 20, the tag tape material W, advances vertically downward by operation of feeder 60 between slide plate 52b and rubber buffer 58m, through folder 55 and beyond folder lower end 55a and shears 57, and has tag-tape length L that is cut off retained against complete folding by said spacer 56 so that a portion of a continuous length of string strand S which is to provide the string handle H is drawn between the folded tag length L. Said string strand S may be supplied from a conveniently located suitable source, such as, a wound spool, (not shown) in the well understood manner. Said string strand S may be directed by a guide block 66 from a suitable slack tension fitting 66a, first in a horizontal direction transversely with respect to the vertical path of movement of tag tape material W and then vertically downward substantially midway between said portion of material folded and cut by said shears 57 to provide tag length L.

There is also provided a pair of spaced plates 66b secured to upstand from block 66 for confining the path of movement of the sheared tag length L which coacts with fold spacer 56 for directing said sheared tag length L and string strand S to a suitable tag and string heat sealer positioned directly below guide block 66.

To positively convey each sheared tag length L in its movement from folded lower end 55a to said tag and string sealer, there is provided, as shown in Figs. 11 to 15, a carrier 75 which includes a cross head 75a reciprocatingly mounted for movement on a track slideway 75b.

Said cross head 75a has mounted thereon in the path of movement of sheared tag length L a fixed jaw 75c and a rock lever 75d pivoted thereto terminated at one end by a swingable jaw 75e to cooperate with fixed jaw 75c for gripping and moving therewith the sheared tag length L. The other end 75f of said lever 75d slides on a cam rail 75g and controls the gripping and releasing of said tag length L between said jaws 75c and 75e, a spring 75h being provided for urging lever end 75f against cam rail 75g.

The cam rail 75g is pivotally mounted at 75j on a U-shaped member 75k between extension arms 75m which may be made integral with bracket member 50c as shown in Figs. 10, 11, 12 and 13. For swinging said member 75k on pivots 75j, there is provided a pivoted connection 75n on which end 75p of a horizontally disposed drive rod 75q rocks. The other end 75r of rod 75q pivots on end 75s of a vertically extending lever 75t, and the lower end 75u of lever 75t carries a roller 75v which rides on a disc cam 75w mounted to turn with shaft 51 as shown in Figs. 1 and 2.

To reciprocate cross head 75a, it is connected through link 76d to end 76b of an arm 76a of a bell crank 76 which is pivoted at 76c. The other arm 76e of bell crank 76 has its end 76f actuated by being pivotally connected to one end 77a of a horizontally disposed drive rod 77, as shown in Figs. 12, 13 and 20, while the other end 77b of said rod 77 is pivoted at 77c to an upwardly extending arm 78a of cam lever 78. The latter is mounted to rock shaft 51d and has downwardly extending arm 78b which carries a roller 78c riding on cam disc 79 which turns with main shaft 51, as shown in Figs. 1 and 2.

Thus carrier 75 operates in timed relation to seize each tag length L as it is sheared from the leading end of tag material W as it passes folder end 55a, and delivers and releases said tag length L on being clamped between a stationary die 67 and a movable companion die 67b of the tag and string handle sealer, as is clear from Fig. 15.

As shown in Figs. 15 and 20, said die 67 may be electrically heated and rigidly mounted on angle bracket 67a, which also supports block 66, and die 67b may be electrically heated and pivotally mounted for movement toward and away frim die 67 between which the folded tag length L with the strand string S pass for heat sealing the interposed portion of string strand S therebetween. The movable die 67b is supported by a twin arm lever 67c as seen from Figs. 1 and 2, and is actuated through a horizontally extending drive rod 67d, having an end 67e thereof pivoted to a rock lever 67f, the latter being in turn resiliently interconnected on a shaft 67g to an arm 67h of offset lever 67j. The other arm 67k of lever 67j carries a roller 67m that rides in a groove 67n of a plate cam 67p mounted on main drive shaft 51. Rock lever 67f also has an arm 67r to which is secured an end of a helical tension spring 67s, the other end of said spring 67s being anchored to the pivot hub of rock lever 67j at 67t to provide uniform effective spring pressure for movable die 67b. Said spring 67s is arranged to be effective for actuating the movement of said die 67b when moving in a direction toward the stationary die 67 during each heat sealing operation.

A predetermined length of string strand S that is to form string handle H is drawn between folded tag length L with fold spacer 55a in position therebetween before said heater sealers dies 67 and 67b are effective. To accomplish these results the said string length portion that forms the string handle H follows downwardly by being pulled as will hereinafter be described behind a heat sealed tag T that passed into a chute 68 after being released from between dies 67 and 67b.

Chute 68 slopes angularly downward and may have an upper wall portion formed of a flat spring 68a which resiliently retains the tag T passing thereunder temporarily to extend partially beyond bottom end 68b of chute 68 on being drawn therethrough after leaving the dies 67 and 67b. The rear wall 68c of the chute 68 may communicate with the inlet end 68d of a conduit 68e, the other end 68f of said conduit being connected to an exhaust fan 68g driven in any suitable manner, for example, by electric motor 68h, and serves to draw air from chute 68 for cooling the heat-sealed tag T and also for keeping the adjacent surrounding machine parts about said tag T and string strand S free from foreign or loose material.

Figure 3:
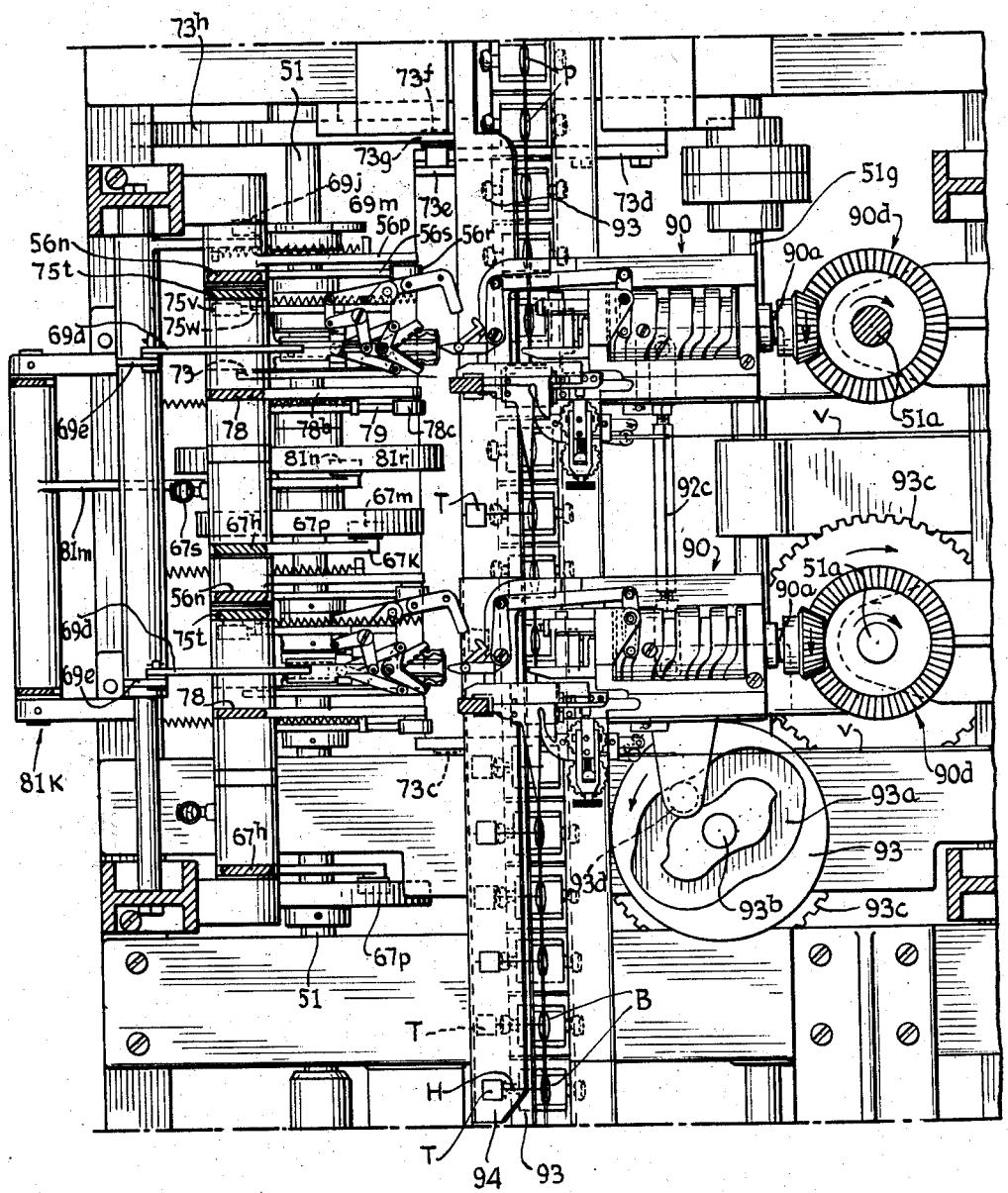
Fig. 3 is a plan cross-sectional view taken on lines 3—3 in Fig. 1 showing portion of the improved tag and string-handle applying mechanism incorporated in the improved packaging machine with details of the construction just above the level of the stapling operational means.

As each heat sealed tag T is drawn to said partially extended position beyond chute end 68b, a string cutter means, denoted generally at 69, severs string strand S close to the leading or lower end of tag T by actuation of swingable clipping blades 69a thereof through a suitable linkage 69b mounted to reciprocate on a slideway 69c. Said linkage includes a striker lever 69n for cooperating with gripper jaws 81a and 81b of a transferor 80 hereinafter more fully described and as shown in Figs. 24 and 28, and connects through a drive rod 69d for reciprocation by pivotal attachment with a one arm 69e of a rock lever 69f mounted on stationary shaft 69g. The other arm 69h of rock lever 69f carries a roller 69j pressed by a suitable spring 69k to ride on cam disc 69m, as shown in Figs. 1 and 3.

Each tag T extending from chute end 68b after the string cutter means 69 has severed string strand S is grasped by a pair of movable mounted gripper jaws 71a and 72b of a string handle applying means 70 which also carries string cutter 69 with the slideways 69c, on a rigid inverted angle support 70a having a suitable formed track 70b extending along an underside thereof on which a shoe 71 slides in a general angular direction aligning with the chute 68. Said shoe 71 carries said gripping jaws 71a and 72b, which may be of the tong type, jaw 71a being mounted relatively stationary with respect to the shoe 71, and jaw 72b which is pivoted, as at 72c to shoe 71. Said jaw 72b normally is urged into a gripping position with respect to jaw 71a by suitable spaced compression springs 71d, as shown in Figs. 20 and 23. Jaws 71a and 72b when in fully extended position as shown in Fig. 20, grip the tag T and move with the shoe 71e to its extreme retracted position as shown in Fig. 27.

Shoe 71 is reciprocated on the track 70b by a draw bar 71e which has an upper end 71f pivoted to the shoe 71, and has the other or lower end 71g pivotally connected with a free end 73a of a curved arm 73. The other end 73b of said curved arm 73 is mounted to swing with a rotatable shaft 73c, the ends of the latter being journalled in spaced apart bearings 73d, as shown in Figs. 2, 20 and 21. For swinging shaft 73c there is provided a cam engaging arm 73e extending therefrom which carries a roller 73f that rides in a cam groove 73g formed in the side of a cam plate 73h, the latter being mounted to turn with main drive shaft 51 as shown in Figs. 2 and 3.

As shown in Fig. 23 said pivoted jaw 72b has extended therefrom a pin 72e for controlling the effective gripping and releasing of the tag T between said jaws, 71a and 72b. Said pin 72e rides on opposite sides 70c and 70d of a switch track rail 70e, the latter being positioned in parallel alignment on a side of angle support 70a and extending in right angle relation with respect to the side of said angle support 70a carrying the track 70b. The upper or leading end 70f of track rail 70e is curved to merge said side 70c with side 70d, so that, when the shoe 71 is in its extreme raised position on the upstroke, the pin 72e rides from along the side 70c to switch over to the side 70d after passing said end 70f, thereby bringing the gripping jaws in said gripping position, the pivoted jaw 72b and pin 72e being urged to swing over by the spring 71d.

The other or lower end 70g of track rail 70e terminates a distance corresponding to midway the length of track 70b and may be proportioned to determine the length of the string handle H, through its control of the timed swing movement of said pin 72e in conjunction with a switching gate or frog 70h. The latter forms a lower extension to track rail 70e, and is pivoted at one end 70j to abut rail end 70g permitting free end 70k of gate 70h to swing against the action of a compression spring 70m. Said gate free end 70k is also curved to provide merging means to permit switching the pin 72e from track side 70d to track side 70c on the downstroke just after the pin 72c passes said free end 70k.

Swing jaw 72b may remain in an effective tag gripping position during the entire downstroke and the upstroke travel of pin 72e for a slight distance before it strikes the rounded free end 70k at which time, gate 70h is swung by spring 70m against a stop rail 70n spaced from and extended beyond track rail 70e. During the downstroke, the gate 70h is swung by movement of the pin 72e to compress spring 70m by pressure applied to slide rod 70p as is clear from Figs. 20 and 32, which after passage of the pin 72e return swings gate 70h to present the rounded end 70k thereof during the upstroke, thereby permitting changeover or switching of pin 72e from rail side 70d to side 70c, as is clear from Figs. 20, 21, 22, 23 and 27. Shoe 71 with jaws 71a and 72b when in fully raised position reach said jaws up above the level of string cutter 69 and just short of bottom chute end 68d so as to seize the next tag T thereat, as shown in Fig. 20.

Just before string cutter 69 clips string strand S, free end Q of string handle length H cut from the string strand S is seized by gripping jaws 81a and 81b of transferor 80 to position the same against said sealed seam C for stapling. Said jaws 81a and 81b may also be of the tong type and are located to lie at a horizontal level slightly below clipping blades 69a. A swing arm 81c carries said jaws 81a and 81b, said arm 81c being mounted for pivoting movement with shaft 81d journalled in bearings 81e in a depending position, as shown in Fig. 20. For swinging arm 81c, a draw bar 81f, is provided which has one end 81g thereof pivotted to a midportion of said arm 81c, the other end 81h of draw bar 81f being pivotted to an arm 81j of a bell crank 81k. The other arm 81m of bell crank 81k carries a roller 81n which rides in a cam groove 81p formed in the face of a cam plate 81r, the latter being mounted to turn with the main drive shaft 51 as shown in Fig. 1.

Gripping of cut string handle end Q by transferor jaws 81a and 81b is so arranged in timed relation to be actuated by said strike lever 69n of linkage 69b to momentarily swing said jaw 81a, which is pivoted to jaw 81b at 81s and is normally urged into gripping position by a compression spring 81t, swinging open against the action of said spring 81t. Said strike lever 69n terminates in a cam end 69p which operates jaw 81a to cause the said cut string-handle end Q to be seized just before it is severed and to immediately retain and move the same as above described by the swing movement of arm 81c.

Spring gripping jaws 81a and 81b in carrying cut string end Q toward the closure seam C after being clipped by string cutter 69 as seen from Figs. 20 and 27, draws portion of the cut string between said cut string end Q and the attached tag T to lie against a plate 82 which may extend slightly tilted out of a horizontal plane and has an open ended slot 82a formed therein across which string handle end Q is extended. Said slot 82a provides passage for a hook member 83 which is mounted to vertically oscillate from beneath the level of the plate 82 to above said level thereof by a suitable camming means, as for example an arm 83a pivoted at one end 83b, said hook member 83 terminating at the other end of arm 83a. A midportion of said arm 83a carries a rotatable roller 83c which rides in groove 83d of a cam plate 83e, as shown in Figs. 25 and 26.

Cam plate 83e may be mounted for rotation with a stapler shaft 90a of a wire stapler, designated generally at 90, said cam plate 83e being mounted to turn with overhanging end 90b of said stapler shaft 90a, which, as shown in Figs. 25 and 26, has a shaft end 90c opposite said end 90b, driven through a set of bevel gears 90d by said vertical secondary drive shaft 51a below bevel gears 51b as shown in Fig. 2.

Releasing of string handle end Q from the grip between jaws 81a and 81b when the transferer arm 81c is swung the required distance toward and beyond package closure seam C for positioning string handle end Q for stapling, as clear from Figs. 20 and 28, is accomplished by tripping a projection 81u provided on jaw 81a which is effective to swing said jaw 81a away from jaw 81b against the action of spring 81t. Said tripping occurs after the extreme end of the swing of arm 81c and after the loop is formed by hook member 83 and positioned for stapling against the bag closure seam C. Then projection 81u strikes a trip bar 81w mounted on wire stapler 90 just above the plate 82 as is seen from Figs. 24, 25, 26 and 28.

To releasably hold string-handle H and string-handle cut end Q in said extended position on plate 82 across slot 82a and in the path of movement of hook member 83a, before jaws 81a and 81b have released said string-handle end Q as shown in Figs. 24 and 28, until said string-handle end Q is brought into position for stapling, and before the loop is formed by hook member 83, a suitable resilient string tension retainer means, denoted generally at 85, is provided.

Tension retaining means 85 as seen in Figs. 20, 27 and 29, includes a swingable arm 85a pivoted at one end 85b and having a free end 85c formed with a spring actuated pressure foot 85d which is located to contact the string-handle H in a portion thereof lying between the tag and plate slot 82a, and a shallow groove 82b provided in said plate 82 under the region where string-handle end Q extends and on the rim of which said foot 85d rides, detail construction of said pressure foot 85d being shown in Figs. 32 and 33.

Spring actuated pressure foot 85d reciprocates in a slideway 85e formed on bracket 85f which is mounted on said lever end 85c for movement limited by suitable means, such as slot and pin 85g. The spring pressure for said foot 85d may be provided through lever arm 85h pivoted at 85j and a suitable tension spring 85k arranged as shown in Figs. 32 and 33.

Since plate 82 oscillates with wire stapler 90 in the manner hereinafter described, groove 82b may be made sufficiently long to take care of the swinging movement.

The portion of the string-handle H over groove 82b may accidentally become displaced from underfoot 85d when plate 82 oscillates with wire stapler 90. To prevent such displacement a stop lug 85m mounted on bracket 85f is provided which rides in groove 82b to serve as a barrier.

A cam means 85n, carried by swing arm 81c and having an interposing surface 85p, is also provided onto which lever end 85c is caused to ride to raise lever 85 with pressure foot 85d for releasing the string-handle H after the hook member 83 has become effective to engage said string-handle end Q in proper timing sequence.

For holding the lever end 85c in cooperative position on cam member 85n a suitable bias tension spring 85q may be provided as shown in Figs. 20, 27 and 29.

Stapler 90 may be of any suitable construction and is here shown to be similar to the Wire Staple Former and Stapler fully described as to construction and operation in applicant's Patent No. 2,428,026 of September 30, 1947.

As shown in Figs. 24 and 28, said stapler 90 has a drawn wire V from a supply source (not shown) inserted through a conduit 91 and between rollers 91a and 91b which are adjustable by finger screw 91c. On rotation of said stapler shaft 90a with cylinder cam 91d which actuates various slide members thereof to cut off a portion of wire V and bend end piercing prongs thereon to provide a U-shape structure, that is, an open prong staple on die head 91e which on movement of member 91g of said slide members will be permanently clinched to provide anchoring staple X for anchoring string handle end at high speed and in timed relation, after the latter in looped form is positioned against filled packages seam C to the requirement of continuous movement thereof between die head 91e and its cooperating jaw head 91f, carried by member 91h of said slide member as is clear from Figs. 2, 20, 24 and 26, and in the manner described in detail in said Patent No. 2,428,026.

Stapler 90 may be mounted for oscillation on forked bracket 92 having sleeve portions 92a which are mounted through thrust and roller ball bearing 92b on vertical power drive shaft 51a below bevel gears 90d as shown in Fig. 2. Power drive shaft 51a may be supported from machine frame F in bearings 51e and is driven from the lower end thereof through spiral gears 51f which connects with a horizontally disposed second main drive shaft 51g. The latter extends in spaced parallel alignment with respect to main drive 51 may form therewith an interconnected power transmission for machine A from a suitable power source such as an electric motor (not shown) in any well understood manner.

For giving the oscillating movement to stapler 90, a cam plate 93 having groove 93a as shown in Fig. 3 may be provided and mounted to turn with vertically extending shaft 93b, the latter being driven through a set of meshing gears 93c from vertical drive shaft 51a. Said cam plate groove 93a has a roller 93d riding therein for actuating a lever connecting with bracket 92 which gives one of said staplers 90 the desired oscillating motion and which through a tie rod 92c pivoted at opposite ends to extend between said brackets 92 swing both in unison.

The timing and operation of the two spaced apart staplers 90 in such that, as here shown, where mechanism 50 is incorporated in a machine A operating to fill and heat seal with closure seams C four filled packaged teaballs P in one group while the packages are in continuous motion, to simultaneously anchor two separate ends of string handles H to closure seams C, in unison the latter being spaced apart with four intervening packages in the advancing path, as shown in Fig. 3.

Thus it is seen that the rate of tag forming and attaching of string handle ends by each stapler 90 is one-half the rate of packaging of tea-balls P, by machine A, that is, the rate of forming tags with string handles in consecutive sequence in two paths and attaching same each corresponding in number to one-half of the filled packages P, being formed in each of said group by machine A.

From the above description and drawing, the embodiment of the invention as to mechanism 50 used individually or in combination with a super high-speed machine for manufacturing filled packages such as machine A can now be readily understood.

When mechanism 50 is utilized individually or incorporated to operate in time relation with suitable package apparatus such as machine A, pliably bendable tag forming tape sheet material W having a dry heat-sealed coating E and printed or unprinted opposite side O supplied from reel M is passed over both slack feeding rollers 52 and 52a and under slack drawing roller 53 as shown in Figs. 4 and 5. The leading end portion of tag tape sheet material W passes between unwinding control buffer 58m and slide plate 52b as shown in Figs. 6 to 9, where said leading end portion is retained during the timing period when slack drawing roller 53 moves in a downward direction to unwind over rollers 52 and 52a the tag tape sheet material W from reel M to provide slack after which said buffer 58m moves through its camming operation in timed relation to automatically release said retention for permitting said leading end portion to follow down through folder 55 in its advancing path movement toward the path of movement of filled packages P with the closure seams C of machine A.

In setting up mechanism 50 before commencing operations for servicing machine A or when renewing the supply tag tape material W, knob 58a of hand lever 58 may be manually swung temporarily so that said buffer 58m released from said effective retention position, that is, held away from slide plate 52c, while the leading end portion is threaded therealong and through the folder 55.

As seen from Figs. 15 and 19, intermittent advancing movement of the leading end portion of tag tape material W is provided by feeder 60 which through finger 65h of oscillation member 65 engages on a down stroke thereof into one of the uniformly spaced holes J of tag tape material W, and for retracting said finger 65h to clear said hole J thereafter in the manner shown diagrammatically in Fig. 19, so that the length of said effective stroke and the spacing of holes J predetermines the tag length L corresponding to said intermittent advancing movement which through the cam drives, above described and shown in the drawings, is timed to take place during said releasing operation by buffer 52c thereby permitting the taking-up of the slack by providing for unrestricted advance movement of the leading tag length L of tag tape material W.

While passing down through folder 55 said leading end portion of strip material W is, however, first bowed or flexed, that is, folded into a U-shaped cross section so that the pliably bendable character thereof is made relatively rigid longitudinally with respect to the advancing movement produced while passing through feeder 60 to positively prevent buckling when engaged and propelled by oscillation of said finger 65h which projects said leading folded end portion beyond the lower folder end 55a where a tag length it cut off by the operation of shears 57. The latter operates in timed relation through links and cam drives and the manner already set forth above.

While the above described operations are taking place, continuous string strand S is being drawn under tension provided by spring fitting 66a from suitable supply spool source (not shown) and directed by guide block 66 to extend between folded portions of material W before being cut. String strand S drawn a predetermined length portion corresponding to a string handle H, which through each tag length L by operation of carrier 75, guided by spaced plates 66b and retained by fold spacer 56, is directed to tag and string heat sealer positioned directly below guide block 66 as shown in Figs. 15 and 20.

The folded tag L is heat sealed to the string strand S as tag T between electrically heated stationery die 67 and movable die 67b, power being supplied from a suitable source through wiring N, so that tag T terminates one end of string handle H cut from string strand S by shears 57.

The predetermined length portion of strand S drawn through folded tag L which forms string handle H precedes said heat sealed tag T, which after being heat sealed directed above and released from between dies 67 and 67b passes down chute 68 where the tag T is temporarily retained by the action of flat spring 68a until being gripped by jaws 71a and 72b which travels by movement with shoe 71 on slideway 69c to automatically measure the predetermined length of string handle H, as is clear from Figs. 20 and 21.

Since string cutters 69 are actuated in timed relation with tag length L cutting and string strand S drawing through the cam operation described above, said jaws 71a and 72b are moved from an upper or extended gripping said tag T downwardly, that is, retracted while retaining grip on tag T until said jaws 71a and 72b are again raised to extend into the projected position shown in Fig. 20.

Meanwhile transferer 80 becomes effective by the operation of jaws 81a and 81b in seizing string handle end Q just before being severed by cutters 69. Through the lever and cam action already described, said transferrer 80 moves toward the intersection with the path of the filled packages P carried by the continuously moving jaws G of machine A in constant advancing motion.

The portion of the string handle H between the tag T and string handle end Q is, by said transferrer movement with said jaws 81a and 81b gripping said string handle end Q, extended over plate 82 and beyond the slot 82a. An intermediate portion of the string handle H meanwhile is temporarily held by retainer 85 until after the hook member 83 is extended up through said slot 82a engaging said string handle end Q for carrying the latter in a looped form against a mid-portion of one of the constantly moving filled package closure seams C and also for positioning said loop to be clinched between the die head 91e and jaw head 91f of stapler 90 which applies the anchoring staple X to permanently secure said loop of string handle end Q to package closure seam C while the latter is being constantly advanced in the path of movement by jaws G of machine A.

Each stapler 90 is oscillated in timed relation to conform to the rate of passage of the package closure seams C and retainer 85 is automatically brought in and out of effective position by means of gearing and cam drives which have already been described.

Machine A, as here illustrated, fills and seals a multiple number of packages, simultaneously, that is, for example, four filled packages P at one time, each with a heat sealed seam C, said packages P being carried in a continuous sequence on constantly advancing jaws G. To automatically service such output of machine A, two separate mechanisms 50 are shown to be provided operating in unison for applying anchoring staples X simultaneously on two moving filled packages P spaced five apart. Each mechanism 50 makes and applies one-half the required tags and string handles H and operates on every other filled package P in the sequence.

After string handle ends Q of string handles H have been stapled to the filled packages closure seams C to provide finished tea balls B, the released string handles H and tags T thereof completed and stapled by both devices 50 drop down and freely ride along horizontally extending guiding shields 93 and 94, said shields 93 and 94 being arranged in spaced apart alignment so that said tea balls B thereafter are delivered at the end of machine A, as is clear from Fig. 3, for counting and packing in containers.

In practising the improved method embodying the invention steps are taken to form filled package P with heat sealed closure seams C, preferably in multiple, such as in groups of two or more in consecutive sequence and in constantly advancing motion along one path while forming tags T from a normally flat pliably bendable tape sheet material W by withdrawing a slack portion thereof from the supply source on flexing the leading end thereof into a longitudinally extending U-shaped cross-sectional fold to stiffen same against buckling strains concurrently while being given advancing movement in a second path in a direction toward said first path.

The advancing movement of the leading end of said tape material W is intermittent, each movement corresponding to a predetermined length L of the tag T, the moving power being applied to the folded length L without causing buckling thereof, and string-strand S being drawn through the fold portion a predetermined length to provide string handle H, after which the folded tag length L is heat sealed to the string-strand S. The latter is then cut to terminate the string handle H at the tag T formed. The free end Q of string handle H after being cut from string strand S meanwhile is gripped and transferred from the second path to a position against the package closure seam C which is constantly advancing along the first path where string handle end Q is permanently secured by anchoring staple X. Mechanisms 50 operate in a like manner in unison and in timed relation to automatically service the entire output of machine A without interruption to the full capacity thereof.

It will thus be seen that there is provided a mechanism, a machine combination and a method in which the several objects of this invention are achieved and which is well adapted to meet the conditions of practical use.

As various possible embodiments might be made of the above invention, and as various changes might be in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In a method of manufacturing filled packages with string-handles and tags, the steps of forming filled packages each with a closure seam in uniformly constant advancing motion along one path, forming complete severed individual string handles each terminated at one end by a tag along another path, and stapling the other end of the string handle to each closure seam while said packages are in said constant motion in the first mentioned path.

2. In the method of manufacturing filled packages with string-handles and tags as defined in claim 1 including the step of transferring said other end of each string-handle for said stapling from the second mentioned path to each package closure seam moving in the first mentioned path.

3. In the method of manufacturing filled packages with string-handles and tags, the steps of folding tags from strip sheet material and attaching each of said tags to terminate an end of a string handle along a first path, forming simultaneously filled packages in multiple each with a closure seam in uniformly constant advancing motion along a second path, and anchoring the other end of each string-handle to each package closure seam while said packages are in said continuous motion in said second path.

4. The method of manufacturing packages with string-handles and tags defined in claim 3 in which the anchoring step takes place simultaneously at a plurality of spaced apart filled package closure seams while said packages are in said constant motion in said second path.

5. The method of manufacturing packages with string-handles and tags defined in claim 3 in which the anchoring step takes place simultaneously on at least two spaced apart filled package closure seams with each of said anchoring steps operating at one-half the relative rate with respect of the rate of forming packages with closure seams advancing in said second path.

6. In the method of manufacturing packages with string-handles and tags, in combination with steps of forming groups of even numbered filled packages having sealed closure seams, the steps of advancing in uniformly constant motion said groups of filled packages continuously along a first path, forming string-handles and tags in consecutive sequence in paths corresponding in number to one-half of the filled packages being formed in each of said groups, advancing said string-handles and tags along said paths intersecting said first path in timed relation to the rate of said advancing movement of said group of filled packages in the first path, and anchoring free ends of each string-handle to closure seams of spaced apart advancing filled packages while in said constant motion in said first path, the anchoring of the handle free ends being simultaneously performed at the intersection of said second mentioned paths with said first path at a rate with respect to the forming of the filled packages, that is, inversely proportional to the number of said second paths.

7. In the method of manufacturing packages with string-handles and tags, the combination of steps defined in claim 6, in which the steps of forming filled packages takes place in groups of four, and the steps of forming handles and tags and advancing same takes place in two paths, and the simultaneous anchoring of the handle free ends is performed on the closure seams of two spaced apart filled packages while in said constant advancing motion in said first path.

8. In a machine for manufacturing filled packages with closure seams having string-handles and tags stapled thereto and provided with a supply source of thin pliably bendable normally flat tag tape material having longitudinally aligned openings spaced apart along a mid-portion thereof and a string-strand supply source, the combination of means for intermittently feeding the tag tape material from said tape material supply source in a continuous strip along a first path of advancement, a folder member positioned in said first path of advancement to receive from said feeding means said tag tape strip for flexing a leading portion thereof with an open fold extending longitudinally in the direction of said advancement for stiffening the tape against buckling, oscillating means mounted to extend during a stroke thereof into engagement in one of said openings of said tag tape strip leading portion to advance the latter a predetermined tag length in said first path, severing means positioned for cutting off said tag length after being advanced by the oscillating means, means for guiding under tension a string-strand passing from the supply source to extend between the open fold of the tag tape length, means for drawing a predetermined length of string-strand through and past said tag length open fold, heat sealing means in said path of advancement effective to close and seal said open folded tag length with said drawn string-strand therebetween as a permanent tag, carrier means for moving the severed tag length portion along said path to the heat sealing means, means for cutting the string-strand to said predetermined length as a string-handle having a free end, means for actuating said cutting means in timed relation after said string-strand drawing means and tag heat sealing means have performed their said respective operations, means for moving said filled packages in a second path at a uniform constant speed, means for transferring each of the cut free ends of the string-handles to said closure seam of one of said filled packages, means for permanently stapling said transferred cut string-handle free end to said package closure seam, and means for moving said stapling means in a path along said second path.

9. In a tag and string-handle manufacturing and applying apparatus, means for making a tag from a leading end portion of a continuous web of tag forming sheet material along a first path of movement, means for supplying a continuous string-strand along a second path merging with said first path of said tag making means, means for securing each tag to the string strand in the merging path of said tag making and string-strand supplying means, means positioned along said merging path of the tag making and string-strand supplying means for cutting said string-strand to provide a predetermined length of string-handle terminated by the tag and having a free end, means for moving filled packages each having a closure seam in a third path at a uniform constant speed, means for grippingly engaging the tag and said free end and transferring the string handle free end to the closure seam of a package moving in said third path, means for anchoring said transferred string-handle free end to said package closure seam, and means for making each of the aforesaid other means effective in timed relation to provide a continuous progress of operations of said manufacturing and applying apparatus.

10. In a mechanism of the character described associated with a machine for forming packages each having a closure seam and moving in a path at uniformly constant motion, means for making in sequence separate completely severed string-handles each having one free end and a tag on the other end, means for transferring each string-handle and tag upon completion toward said path of the advancing packages, and means for attaching a free end of said string-handle to said closure seam while each package continues in said motion.

11. In a mechanism of the character described as defined in claim 10 in which said string-handle attachment means includes a stapler, and means for mounting said stapler to oscillate along said path in an effective timed relation with respect to said advancing motion of the packages during said attaching of each string-handle end to a passing package closure seam.

12. In a machine for manufacturing filled packages with closure seams having string-handles and tags stapled thereto, means for moving said filled packages each with a closure seam in a path at a uniform constant speed, a plurality of means for simultaneously making a plurality of string-handles each having a free end and terminated at the other end with a tag, a means for each of said string-handle making means for transferring the string-handles and tags upon completion toward said path of travel of the packages, and means for driving said string-handle making means and said transferring means in timed relation with respect to said filled package moving means for delivering the free ends of said plurality of string-handles simultaneously to spaced apart closure seams of said packages in series while said packages continue at said uniform speed in said path.

13. The machine as defined in claim 12, including a means for each of said string-handle making means for attaching said free ends to said closure seams each including a stapler mounted for oscillation along said path, and means for operating the staplers simultaneously effective to anchor one of said string-handle free ends to said spaced apart closure seams of each of said packages while continuing at said uniform speed.

14. In a mechanism of the character described provided with a supply source of relatively thin pliably bendable tag tape material having longitudinally aligned openings spaced apart along a mid-portion thereon and with a string-strand supply source, a folder member spaced from said supply source, means for intermittently feeding said tag tape material in a continuous strip from the supply source into said folder member, said folder member flexing a leading portion of said tag tape material with a longitudinally extending open fold to stiffen said flexed leading portion, tag tape material advancing drive means located to intermittently engage with said openings at said stiffened flexed strip portion for moving in a path of advancement said leading portion a predetermined distance corresponding to a tag length, means for severing said tag length and for retaining the severed tag length passing from said advancing drive means and said severing means in said path of advancement in open folded condition, means for guiding and drawing a predetermined length of string-strand from the source between and past the open folds of the severed tag length portion at said retaining means, heat-sealing means adjacent said retaining means effective to close and secure together the open folds of the severed tag length with the string-strand therebetween to form a permanent tag in said path of advancement, and power-drive means for operating said intermittent feeding means, said severing and retaining means, said string-strand guiding and drawing means and said heat-sealing means in timed cooperative relation.

15. The mechanism defined in claim 14, including cutting means positioned for severing the string-strand to said predetermined length for providing a complete string-handle and tag.

16. The mechanism defined in claim 14 including cutting means positioned for severing the string-strand to said predetermined length for providing a complete string-handle and tag, means for successively gripping a cut free end of said predetermined string-handle length during the severing operation by said cutting means, and means for transferring said gripping means with the string-handle cut end from said cutting means to an exterior side of a closure seam of a moving filled package for anchoring said cut free end thereto.

17. In the method of manufacturing string-handles and tags of the character described, the steps of advancing a normally flat strip of relatively thin pliably bendable tape material by first flexing the tape material into a longitudinally extending fold having a U-shaped cross-section in the direction of the advancing movement to stiffen the tape structure for withstanding buckling strains, applying an advancing propelling force intermittently to the U-shaped cross-sectional fold, severing the advance tag length portion of the folded tape, threading a string-strand between said severed folded tape tag length, and heat sealing the severed folded tag length to the strand in said threaded position therebetween.

18. An automatic machine for manufacturing filled packages with string-handles and tags, comprising means for forming filled packages with closure seams and for continuously moving them in uniformly constant advancing motion along a first path, means for making separate completely severed string-handles each with one free end and terminated on the other end by a tag in consecutive sequence along a second path intersecting said first path in timed relation with the rate of said advancing motion of said package closure seams along said first path, means for moving the string-handles and tags along said second path to said intersection, and stapling means for anchoring said free ends of the string-handles to said closure seams at said intersection of the paths while said packages continue in said constant advancing motion along said first path.

19. An automatic machine for manufacturing filled packages with string-handles and tags, comprising means for forming filled packages with closure seams in multiple groups and for continuously moving them in uniformly constant advancing motion along a first path, means for making separate completely severed string-handles each with one free end and terminated on the other end by a tag in consecutive sequence along a plurality of spaced apart paths intersecting said first path in timed relation with the rate of said advancing motion of said package closure seams along said first path, means for moving the string-handles and tags along said plurality of spaced apart paths to said intersection with said first path, and stapling means in each of said spaced apart path for anchoring said free ends of the string-handles to said closure seams at each intersection of the paths while said packages continue in said constant advancing motion along said first path.

20. In the method of manufacturing string-handles and tags of the character described, the steps of advancing a normally flat strip of relatively thin pliably bendable tape a distance corresponding to a length of a tag by flexing a leading portion of the tape into a fold line longitudinally extending in the direction of the advancing movement to stiffen the tape structure thereat for withstanding buckling strains, applying a moving force to said flexed tape portion at said fold line for advancing the tape longitudinally along said tag length distance, severing one tag length from the leading folded end portion while maintaining the severed tag length in a partially open condition, threading a string-strand between said severed partially open folded tape tag length, and heat-sealing the string-strand in said threaded position between the severed folded tag length.

21. In the method of manufacturing string-handles and tags of the character described, the steps of advancing a normally flat strip of relatively thin pliably bendable tape material having through-openings spaced along a longitudinal fold line by first flexing the tape material along said longitudinal fold line in the direction of the advancing movement to stiffen the tape structure for withstanding buckling strains, and then applying moving force by inserting an instrument oscillating in the advancing direction in said openings successively at said flexed fold to advance the folded tape longitudinally a predetermined tag length distance, severing one tag length from the leading folded end portion of the tape while maintaining the severed tag length in a partially open condition, threading a string-strand between said severed partially open folded tape tag length, and anchoring the string-strand in said threaded position between the severed folded tag length.

22. In a method of manufacturing filled packages with string-handles and tags including the steps of folding a normally flat leading end portion of pliably flexible tag forming tape sheet material longitudinally to have a U-shaped cross-section for stiffening the folded structure therealong, intermittently applying force to said stiffened structure for advancing said tape sheet material a predetermined distance equivalent to one tag length, severing one tag length from the leading folded end portion while maintaining the severed tag length in a partially open condition, threading a string-strand between said severed partially open folded tape tag length, completely closing the folded tape tag length and heat-sealing the string-strand in said threaded position between the severed folded tag length.

23. The method defined in claim 22 including the steps of cutting the string-strand at a predetermined distance beyond the heat-sealing joint of the tag length to provide a string-handle, and transferring each string-handle terminated by a tag into position for anchoring at a closure seam of a continuously advancing package.

24. In a mechanism of the character described provided with a supply source of relatively thin pliably bendable tag tape material having longitudinally aligned openings spaced apart along a mid-portion thereof, a folder member spaced from said supply source, means for intermittently feeding said tag tape material in a continuous strip from the supply source into said folder member, said folder member flexing a leading portion of said tag tape material with a longitudinally extending open fold to stiffen said fixed leading portion, said spaced apart openings being arranged along the apex of said fold, tag tape material advancing drive means located to intermittently engage with said openings at said stiffened flexed strip portion and advance the tag tape material a predetermined tag length, severing means positioned for cutting off said tag length after being advanced by said advancing drive means, and means for supporting said severed tag length in said open folded condition while guiding a string-strand between the open fold of the severed tag tape length.

25. In a mechanism of the character described provided with a supply source of relatively thin pliably bendable tag tape material having longitudinally aligned openings spaced apart along a mid-portion thereof, a folder member spaced from said supply source, means for intermittently feeding said tag tape material in a continuous strip from the supply source into said folder member, said folder member flexing a leading portion of said tag tape material with a longitudinally extending open fold to stiffen said flexed leading portion, said spaced apart openings being arranged along the apex of said fold, tag tape material advancing drive means located to intermittently engage with said openings at said stiffened flexed strip portion, and power-drive means for operating said intermittent feeding means and said tag tape material advancing drive means in timed cooperative relation for moving said leading portion a predetermined distance corresponding to a tag length, said tag tape material advancing drive means including an oscillating member mounted for compound reciprocation of relatively up and down direction with respect to the path of advancing movement and toward and away from said path, and an actuating finger carried by said member for said intermittent engagement in said tag tape material openings when moving the tag tape material leading portion said predetermined distance.

26. In a mechanism of the character described provided with a supply source of relatively thin pliably bendable tag tape material having longitudinally aligned openings spaced apart along a mid-portion thereof, a folder member spaced from said supply source, means for intermittently feeding said tag tape material in a continuous strip from the supply source into said folder member, said folder member flexing a leading portion of said tag tape material with a longitudinally extending open fold to stiffen said flexed leading portion, said spaced apart openings being arranged along the apex of said fold, tag tape material advancing drive means located to intermittently engage with said openings at said stiffened flexed strip portion, and power-drive means for operating said intermittent feeding means and said tag tape material advancing drive means in timed cooperative relation for moving said leading portion a predetermined distance corresponding to a tag length, said tag tape material advancing drive means including an oscillating member, an actuating finger carried by one end of said member for said intermittent engagement in said tag tape material openings for moving the tag tape material leading portion said predetermined distance, a first means for moving the actuating finger end of the oscillating member in a relatively up and down direction with respect to the path of advancing movement, a second means for moving the oscillating member toward and away from said path, and a coordinating drive means for operating said first moving means at twice the speed of said second moving means to cause the actuating finger to engage said tag tape material opening on alternate down strokes of said oscillating member end to provide uniform dwell periods in the advancement of said folded tag tape material after each of said intermittent engagements during alternate downward strokes of the oscillating member with the actuating finger ineffective.

References Cited in the file of this patent

UNITED STATES PATENTS

| | | |
|---|---|---|
| 1,642,307 | Ovington | Sept. 13, 1927 |
| 1,645,013 | Kondolf | Oct. 11, 1927 |
| 2,068,724 | Wichulski | Jan. 26, 1937 |
| 2,272,251 | Robinson | Feb. 10, 1942 |
| 2,334,256 | Eaton | Nov. 16, 1943 |
| 2,360,510 | Murray | Oct. 17, 1944 |
| 2,382,778 | Dalton | Aug. 14, 1945 |
| 2,390,071 | Barnett | Dec. 4, 1945 |
| 2,451,287 | Hoppe | Oct. 12, 1948 |
| 2,457,216 | Eaton et al. | Dec. 28, 1948 |
| 2,457,237 | Howard | Dec. 28, 1948 |